(12) United States Patent
Locatelli et al.

(10) Patent No.: US 9,403,693 B2
(45) Date of Patent: *Aug. 2, 2016

(54) PROCESS FOR THE PURIFICATION OF AN AQUEOUS STREAM COMING FROM THE FISCHER-TROPSCH REACTION

(75) Inventors: Lino Locatelli, Pavia (IT); Lino Carnelli, Como (IT); Roberta Miglio, Novara (IT); Roberto Zennaro, Milan (IT)

(73) Assignee: ENI S.p.A., Rome (IT)

( * ) Notice: Subject to any disclaimer, the term of this patent is extended or adjusted under 35 U.S.C. 154(b) by 1013 days.

This patent is subject to a terminal disclaimer.

(21) Appl. No.: 13/140,586

(22) PCT Filed: Dec. 16, 2009
(Under 37 CFR 1.47)

(86) PCT No.: PCT/EP2009/009107
§ 371 (c)(1),
(2), (4) Date: Sep. 13, 2012

(87) PCT Pub. No.: WO2010/069581
PCT Pub. Date: Jun. 24, 2010

(65) Prior Publication Data
US 2013/0008774 A1    Jan. 10, 2013

(30) Foreign Application Priority Data
Dec. 19, 2008   (IT) ................. MI2008A2279

(51) Int. Cl.
*C02F 1/04* (2006.01)
*B01D 3/14* (2006.01)
(Continued)

(52) U.S. Cl.
CPC . *C02F 1/04* (2013.01); *B01D 3/143* (2013.01); *B01D 3/148* (2013.01); *C02F 1/048* (2013.01);
(Continued)

(58) Field of Classification Search
CPC ............. C02F 1/04; C02F 1/048; C02F 9/00; C02F 2101/32; C02F 2101/34; C02F 2103/365; C02F 2209/06; B01D 3/00; B01D 3/14; B01D 3/143; B01D 3/148
USPC .......... 518/700, 704, 726; 203/10, 12, 14, 38, 203/96, DIG. 25
See application file for complete search history.

(56) References Cited

U.S. PATENT DOCUMENTS 6,462,097 B1   10/2002 Martino et al.
6,887,908 B1 *  5/2005 Pruet ............................ 518/700
(Continued)

FOREIGN PATENT DOCUMENTS

JP          9 122692       5/1997
WO         03 106346      12/2003
(Continued)

OTHER PUBLICATIONS

U.S. Appl. No. 13/147,119, filed Jul. 29, 2011, Locatelli, et al.
(Continued)

*Primary Examiner* — Renee E Robinson
*Assistant Examiner* — Jonathan Miller
(74) *Attorney, Agent, or Firm* — Oblon, McClelland, Maier & Neustadt, L.L.P.

(57) ABSTRACT

A process for the purification of an aqueous stream coming from the Fischer-Tropsch reaction using distillation and/or stripping treatment, a treatment with at least one inorganic base and a treatment with at least one organic base. This process allows at least a part of the aqueous stream coming from the Fischer-Tropsch reaction to be used as process water in the synthesis gas production plant, subsequently sent to the Fischer-Tropsch plant for the production of hydrocarbons.

23 Claims, 3 Drawing Sheets

(51) Int. Cl.
  *C02F 1/66* (2006.01)
  *C02F 9/00* (2006.01)
  *C02F 101/32* (2006.01)
  *C02F 103/36* (2006.01)

(52) U.S. Cl.
  CPC ... *C02F 1/66* (2013.01); *C02F 9/00* (2013.01); *C02F 2101/322* (2013.01); *C02F 2103/36* (2013.01)

(56) References Cited

U.S. PATENT DOCUMENTS

| | | |
|---|---|---|
| 7,989,510 B2 | 8/2011 | Locatelli et al. |
| 2004/0262199 A1* | 12/2004 | Roelofse et al. ............ 208/187 |
| 2005/0131084 A1 | 6/2005 | Kohler et al. |
| 2005/0131085 A1 | 6/2005 | Kohler et al. |
| 2007/0010590 A1 | 1/2007 | Abbott et al. |
| 2008/0119574 A1* | 5/2008 | Islam et al. .................. 518/728 |
| 2009/0221720 A1* | 9/2009 | Belt et al. .................... 518/700 |

FOREIGN PATENT DOCUMENTS

| | | |
|---|---|---|
| WO | 2004 096952 | 11/2004 |
| WO | 2008 151742 | 12/2008 |
| WO | 2009 090105 | 7/2009 |

OTHER PUBLICATIONS

U.S. Appl. No. 13/318,498, filed Nov. 2, 2011, Miglio.
U.S. Appl. No. 13/500,434, filed Apr. 5, 2012, Locatelli, et al.
International Search Report issued Apr. 22, 2010 in PCT/EP09/009107 filed Dec. 16, 2009.

* cited by examiner

PROCESS FOR THE PURIFICATION OF AN AQUEOUS STREAM COMING FROM THE FISCHER-TROPSCH REACTION

CROSS REFERENCE TO RELATED APPLICATIONS

This application is a National Stage of PCT/EP09/009107 filed Dec. 16, 2009 and claims the benefit of Italian application MI2008A002279 filed Dec. 19, 2008.

FIELD OF THE INVENTION

The present invention relates to a process for the purification of an aqueous stream coming from the Fischer-Tropsch reaction.

More specifically, the present invention relates to a process for the purification of an aqueous stream coming from the Fischer-Tropsch reaction which comprises a distillation and/or stripping treatment, a treatment with at least one inorganic base and a treatment with at least one organic base.

DESCRIPTION OF RELATED ART

The Fischer-Tropsch technology for preparing hydrocarbons from blends of gas based on hydrogen and carbon monoxide, conventionally known as synthesis gas, is well known in scientific literature. A summary recapitulating the main works on the Fischer-Tropsch reaction is contained in the Bureau of Mines Bulletin, 544 (1955) with the title of "Bibliography of the Fischer-Tropsch Synthesis and related Processes" H. C. Anderson, J. L. Wiley and A. Newell.

The Fischer-Tropsch technology is generally based on the use of slurry reactors, reactors which are adopted in chemical reactions carried out in multiphase systems in which a gaseous phase is bubbled into a suspension of a solid (solid phase) in a liquid (liquid phase). In the case of Fischer-Tropsch reactions, the gaseous phase comprises synthesis gas or "syngas", which is a combination of hydrogen ($H_2$) and carbon monoxide (CO), with a $H_2$/CO molar ratio varying from 1 to 3, preferably about 2, the liquid phase, at the reaction temperature, prevalently comprises the reaction product, i.e. essentially linear hydrocarbons with a high number of carbon atoms, and the solid phase mainly comprises the catalyst. Synthesis gas can possibly contain smaller quantities of carbon dioxide ($CO_2$) and/or water. The presence of sulfur, nitrogen, halogens, selenium, phosphorous and arsenic, or their derivatives, in said synthesis gas, is not desirable. For this reason, and depending on the quality of the synthesis gas, it is preferable to remove the sulfur and other contaminants, before feeding said synthesis gas to the Fischer-Tropsch reactor. Methods for removing these contaminants are known in the art. The use of guard beds based on zinc oxide are preferred for the removal of sulfur or its derivatives. Furthermore, it is generally preferable to remove the carbon dioxide ($CO_2$) which may possibly be formed, from synthesis gas, as well as the sulfur or its derivatives not yet removed. For this purpose, for example, the synthesis gas can be put in contact with a moderately alkaline solution (e.g., a solution of potassium carbonate) in a packed column.

The synthesis gas preferably comes from steam reforming and/or from the partial oxidation of natural gas, typically methane, or other heavier hydrocarbons possibly present in natural gas (e.g., ethane, propane, butane), according to processes known in the art.

In a steam reforming process, the desulfurized natural gas is generally mixed with steam and is passed, operating at a high temperature and pressure, through a catalytic bed comprising a catalyst containing a transition metal, preferably nickel. The steam is usually supplied by means of a saturator in which water is put in contact with the above preheated natural gas.

Alternatively, the synthesis gas can derive from other production processes such as, for example, autothermal reforming or the process known as C.P.O. (Catalytic Partial Oxidation) which use streams of high-purity oxygen or enriched air together with desulfurized natural gas and the catalyst, or from the gasification of coal or other carbonaceous products, with steam at a high temperature as described, for example, in "Catalysis Science and Technology", Vol. 1, Springer-Verlag, New York, 1981.

In the Fischer-Tropsch reaction, the carbon monoxide and hydrogen are converted to water and organic molecules mainly containing carbon and hydrogen (i.e. hydrocarbons). Furthermore, other organic molecules which contain oxygen in addition to carbon and hydrogen, called oxygenated compounds, can be formed during the Fischer-Tropsch reaction.

The Fischer-Tropsch reaction is normally carried out at temperatures equal to or higher than 150° C., for example ranging from 180° C. to 350° C., maintaining a pressure ranging from 0.5 MPa to 10 MPa, preferably ranging from 1 MPa to 5 MPa, inside the reactor.

As mentioned above, the Fischer-Tropsch reaction is facilitated by a catalyst. The catalysts preferably have the function of increasing the reaction rate without being used up during the reaction itself. The type of catalyst influences the relative quantities of hydrocarbons obtained from the Fischer-Tropsch reaction. The catalysts normally used in the Fischer-Tropsch reaction generally contain at least one metal belonging to groups 8, 9, or 10 of the Periodic Table of Elements (in the IUPAC notation dated Jun. 22, 2007).

Catalysts containing cobalt, iron, ruthenium, and/or nickel, can be advantageously used for the conversion of synthesis gas to hydrocarbons suitable for the production of gasoline and/or diesel. Cobalt, for example, is particularly suitable for Fischer-Tropsch catalysts for the production of heavy hydrocarbons from synthesis gas. Iron has the advantage of being easily available and relatively economical but has the disadvantage of increasing the reaction known as "water-gas-shift", which converts a part of the carbon monoxide and water produced into carbon dioxide and hydrogen. Nickel favours the termination reaction and is advantageously used for the selective production of methane from synthesis gas. Ruthenium has the advantage of a high activity but is rather costly.

The Fischer-Tropsch reaction typically produces a mixture of gaseous hydrocarbons, liquid hydrocarbons, and waxes, having a number of carbon atoms varying from 1 to 100 or more, and having different molecular weights. Depending on the molecular weight distribution, these mixtures are suitable for different uses. Mixtures containing liquid hydrocarbons, for example, can be subjected to further treatment in order to obtain gasoline, as well as medium distillates. The waxes can be subjected to a further treatment in order to be converted to liquid and/or gaseous hydrocarbons. Consequently, in order to use Fischer-Tropsch reactions for the subsequent production of fuel, it is desirable to increase the production of liquid hydrocarbons and/or waxes, such as hydrocarbons having at least 5 carbon atoms per molecule ($C_5$ hydrocarbons).

In addition to mixtures of hydrocarbons, the Fischer-Tropsch reaction also generates water according to the following equation:

$$nCO + 2nH_2 \rightarrow C_nH_{2n}, nH_2O.$$

The production of water is quite significant as a mole of water is produced for each mole of carbon monoxide converted to hydrocarbons. When non-shifting catalysts are used, for example cobalt and/or ruthenium, the reaction known as "water-gas-shift" is minimum so that the total production of water is close to that of the stoichiometric reaction. For shifting catalysts, for example, iron, the reaction known as "water-gas-shift" is more significant so that the total production of water is always considerable but lower than that of the stoichiometric reaction.

Before purification, the water coming from the Fischer-Tropsch reaction is subjected to preliminary separations. Typically, it passes through a three-phase separator from which an organic condensate is obtained, together with a vapour phase and an aqueous phase, which still contains organic compounds dissolved and in suspension, and which is preferably treated in a coalescence filter.

The water thus separated remains contaminated by hydrocarbon compounds, typically less than 1,000 ppm, and by oxygenated compounds, soluble in water. The amount of contaminants is in relation to the catalyst and reaction conditions, in particular temperature and pressure. The overall amount of oxygenated compounds increases with an increase in the reaction temperature, the group of organic acids in a more significant way.

The main oxygenates contaminants are light alcohols such as methanol and ethanol, indicatively present in an amount of from 0.5% by weight to 5% by weight. Heavier alcohols (for example, propanol, butanol, pentanol, etc.) and other oxygenated compounds, such as aldehydes (for example, acetaldehyde, propionaldehyde, butyraldehyde, etc.), ketones (acetone, methylpropylketone, etc.) and acids (for example, formic acid, acetic acid, propionic acid, butyric acid, isobutyric acid, valeric acid, hexanoic acid, heptanoic acid, octanoic acid, etc.), are also present in lower quantities, the latter indicatively present in concentrations lower than 1.5% by weight.

The amount of compounds present, within each group, decreases with an increase in the molecular weight, and compounds with up to 25 carbon atoms are included. The water can also contain small amounts of nitrogenated and sulfurated compounds deriving from the feedstock used, in addition to traces of metals which come from the reactor. The metals can also be present in the form of suspended solids.

The water coming from the Fischer-Tropsch reaction consequently does not have a commercial value and cannot be disposed of as such due to the organic compounds present which can create various drawbacks. Oxygenated organic compounds (in particular acids), for example, give corrosive properties, hydrocarbons the tendency to form foams (foaming).

Furthermore, rainwater or other service water present in the production site can be added to the water coming from the Fischer-Tropsch reaction.

A treatment plant of the water coming from the Fischer-Tropsch reaction is therefore necessary for both the re-use of the same within the Fischer-Tropsch process (for example, as process water or cooling water in the reaction section), and also for its disposal outside or for other further uses (for example, as water for irrigation or drinking water).

The treatment or combination of treatments of the water coming from the Fischer-Tropsch reaction is determined by the restrictions imposed by its final use and by the organic compounds present therein.

The treatment plant of the water coming from the Fischer-Tropsch reaction, for example, can be of the biological type, which can be preceded by a treatment, typically distillation and/or stripping, to remove the most volatile compounds. The water deriving from the biological treatment is then generally subjected to a further finishing treatment to remove the solids and, if necessary, also the residual salts from the biological treatment. An approach of this type is suggested, for example, in the U.S. Pat. Nos. 7,166,219, 7,150,831, or in International Patent Application WO 2005113426.

Alternatively, the water coming from the Fischer-Tropsch reaction can be subjected to a treatment of the physico-chemical type. The U.S. Pat. No. 6,462,097, for example, describes a process in which the stripping treatment is followed by an adsorption step on activated carbons. The aqueous stream coming from this adsorption step on activated carbons, rich in organic compounds, can then be sent back to the reaction reactor. Similar suggestions are also provided for example in U.S. Pat. Nos. 6,225,358, 5,053,581, 5,004,862, in which the organic compounds, for example $C_1$ to $C_6$ alcohols, present in the water coming from the Fischer-Tropsch reaction, are potentially brought back and thus upgraded to simple molecules such as $CO_x/H_2$ (synthesis gas).

Other types of treatment, of the physico-chemical type, allow one or more aqueous streams enriched in organic compounds to be separated.

The United States Patent Application US 2004/0262199, for example, describes the possibility of separating, by distillation, a prevalently alcohol stream with a content of non-acid compounds (NAC) ranging from 55% by weight to a maximum of 85% by weight. This stream can be used as fuel or, alternatively, it can be further processed to recover valuable products.

The formation, by treatment of the physico-chemical type, of one or more streams enriched in various groups of organic compounds, contemporaneously with the production of water purified to the required degree, is described for example in the U.S. Pat. No. 7,153,432 which proposes a process with at least two steps, the first a distillation step and the second a separation step with membranes, and optionally, if necessary, other accessory steps for bringing the purified water to the required degree of purity.

U.S. Pat. No. 7,153,432, in particular, describes a purification process of the water co-produced in the Fischer-Tropsch reaction which comprises: (a) subjecting the water co-produced in the Fischer-Tropsch reaction to distillation or liquid-liquid extraction in order to remove at least a part of the alcohols present in said water and to produce a first stream enriched in water; and (b) subjecting said first stream enriched in water to a separation process with membrane which allows at least some of the solids in suspension to be removed together with some organic acids in order to obtain purified water. This separation process with membrane can be selected from the group comprising: micro-filtration, ultra-filtration, reverse osmosis, pervaporation.

Further uses of the water coming from the Fischer-Tropsch reaction are known in the art.

International Patent Application WO 2005/113426, for example, describes a method for the use of the water coming from the Fischer-Tropsch reaction carried out at a low temperature, which includes the phase of feeding the water coming from said reaction to a saturator contained in the production unit of synthesis gas in order to saturate the stream of gaseous hydrocarbons fed to said unit.

U.S. Pat. No. 7,323,497 describes a process for the synthesis of hydrocarbons comprising: (a) subjecting a mixture of hydrocarbons and steam to a catalytic steam reforming process in order to obtain a partially reformed gas; (b) subjecting the partially reformed gas to a partial oxidation with a gas containing oxygen and bringing the resulting gas towards equilibrium by means of a steam reforming catalyst in order to obtain a mixture of reformed synthesis gas; (c) cooling down the mixture of reformed synthesis gas to below the dew point of the steam in order to condense the water and separating the condensed water in order to obtain a water-free synthesis gas; (d) synthesizing the hydrocarbons from said water-free synthesis gas by means of the Fischer-Tropsch reaction; and (e) separating the hydrocarbons from the water co-produced; characterized in that at least a part of said co-produced water is fed to a saturator in which it comes into contact with a feedstock of hydrocarbons thus forming a mixture of hydrocarbons and steam to be subjected to a catalytic steam reforming.

BRIEF SUMMARY OF THE INVENTION

The Applicant has observed, however, that feeding the water coming from the Fischer-Tropsch reaction directly to the saturator can cause various problems. The organic compounds present in this water, for example, in addition to the problems indicated above (i.e. problems of corrosion of the plant and/or of foaming), can cause, in particular the acids, a poisoning of the catalysts used in the steam reforming process.

The Applicant considered the problem of finding a process that allows at least a part of the aqueous stream coming from the Fischer-Tropsch reaction to be used as process water in the synthesis gas production plant, subsequently sent to the Fischer-Tropsch plant for the production of hydrocarbons.

It has now been found that by subjecting the aqueous stream deriving from the Fischer-Tropsch reaction to a purification process which comprises a distillation and/or stripping treatment, a treatment with at least one inorganic base and a treatment with at least one organic base, it is possible to overcome the drawbacks described above and to use at least a part of said aqueous stream in the production plant of synthesis gas subsequently sent to the Fischer-Tropsch plant for the production of hydrocarbons. In particular, said aqueous stream can be used in the production of synthesis gas as a vapour source and, thanks to the presence of oxygenated organic compounds, in particular alcohols, as hydrogen and carbon source, thus increasing the production of said synthesis gas. In particular, it has been found that the treatment with at least one organic base allows the organic acids present in the aqueous stream leaving the head of the distillation and/or stripping column to be eliminated, thus avoiding both the problems of plant corrosion due to the presence of said organic acids, and the poisoning of the catalysts normally used in the production of synthesis gas. It has also been found that the treatment with an inorganic base not only allows a neutralized aqueous stream to be obtained, which can be subjected to further purification treatment depending on the desired degree of purity, but also enables at least part of said organic base to be recovered, which can then be re-used in said purification process.

DETAILED DESCRIPTION OF THE INVENTION

Figure 1:
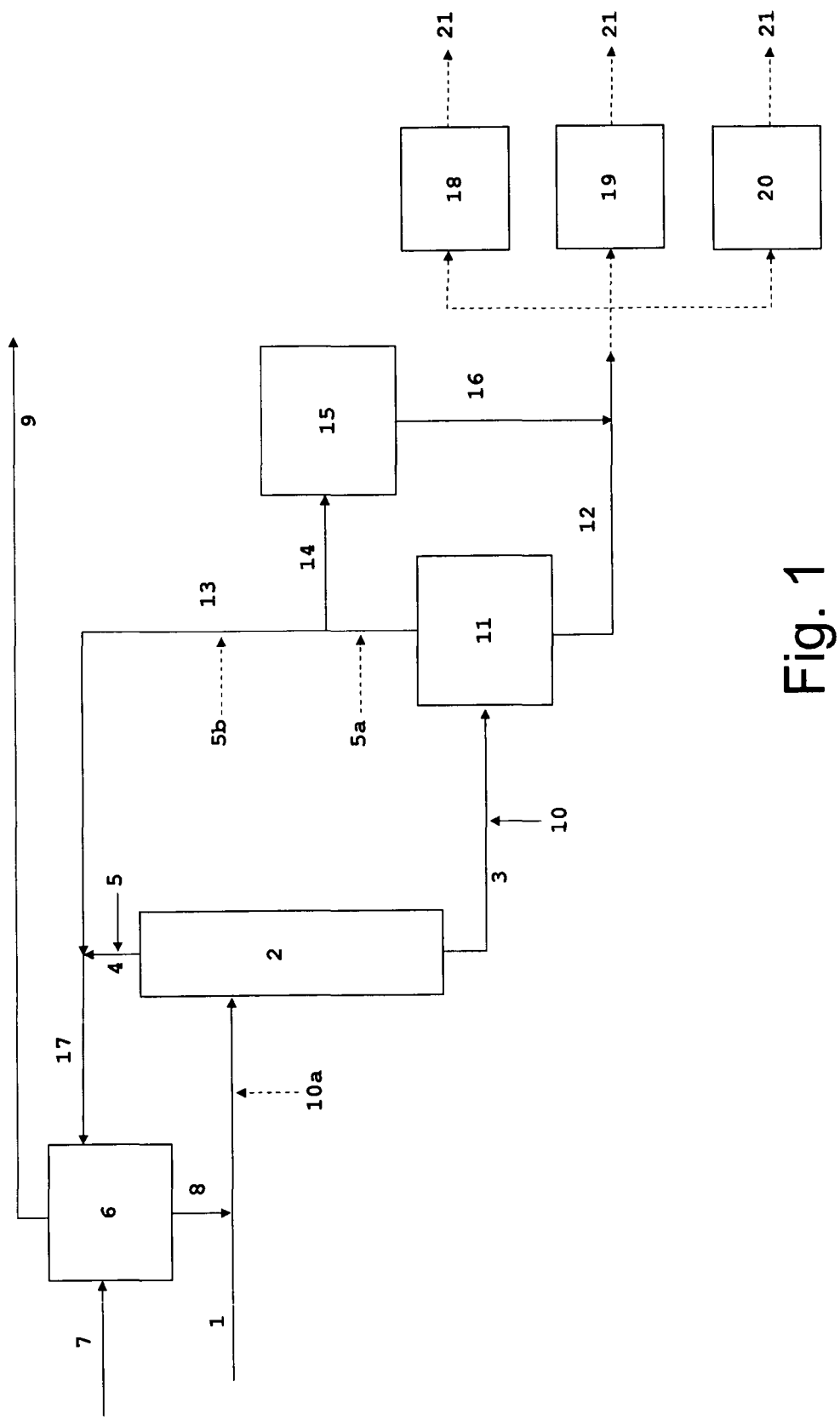
FIG. 1 represents one embodiment of the invention.

According to a first aspect, the present invention therefore relates to a process for the purification of an aqueous stream coming from the Fischer-Tropsch reaction which comprises:

feeding said aqueous stream containing the organic by-products of the reaction to a distillation column obtaining two streams:
  an aqueous stream (i) leaving the head of the column enriched in alcohols having from 1 to 20 carbon atoms, preferably from 1 to 8 carbon atoms, comprising organic acids having from 1 to 8 carbon atoms, preferably from 2 to 4 carbon atoms, in an amount lower than or equal to 2% by weight, preferably ranging from 0.01% by weight to 1.2% by weight, with respect to the total weight of said aqueous stream (i) and possible other volatile compounds;
  an aqueous stream (ii) leaving the bottom of the column comprising organic acids having from 1 to 10 carbon atoms, preferably from 2 to 6 carbon atoms;
adding to said aqueous stream (i) at least one organic base having a $pK_a$, measured at 25° C. in water, higher than or equal to 6, preferably ranging from 7 to 12;
adding to said aqueous stream (ii) at least one inorganic base having a $pK_a$, measured at 25° C. in water, higher than or equal to 7, preferably higher than or equal to 8, and feeding it to an evaporator obtaining two outgoing streams:
  a vapour stream (iii) leaving the head of the evaporator comprising at least a part of said organic base which, after condensation, forms an aqueous stream (iiia);
  an aqueous stream (iv) leaving the bottom of the evaporator comprising salts of the organic acids present in said aqueous stream (ii);
combining said aqueous stream (iiia) with said aqueous stream (i) obtaining an aqueous stream (v) and feeding it to a saturator;
feeding the process gas to said saturator thereby obtaining a gaseous stream (vi) leaving the head of the saturator;
feeding said gaseous stream (vi) to the synthesis gas production plant.

According to a preferred embodiment of the present invention, said gaseous stream (vi) is fed to the catalytic steam reforming.

For the purposes of the present invention and of the following claims, the definitions of the numerical intervals always comprise the extremes unless otherwise specified.

The Fischer-Tropsch reaction can be advantageously carried out as described in U.S. Pat. No. 6,348,510 whose content is considered incorporated herein as reference.

The aqueous stream (i) has a concentration of alcohols preferably higher than or equal to 20% by weight, more preferably ranging from 25% by weight to 70% by weight, with respect to the total weight of said aqueous stream (i).

The aqueous stream (ii) has a concentration of organic acids preferably higher than or equal to 0.05% by weight, more preferably ranging from 0.2% by weight to 10% by weight, with respect to the total weight of said aqueous stream (ii).

Said aqueous stream (ii) preferably comprises an amount of organic acids higher than or equal to 40% by weight, more preferably ranging from 60% by weight to 98% by weight, with respect to the total weight of the acids present in the aqueous stream fed to the distillation column.

For the purposes of the present invention and of the following claims, the term "volatile compounds", possibly present in said aqueous stream (i), refer to compounds such as, for example, hydrocarbons, aldehydes, ketones, or mixtures thereof.

Alternatively, said distillation column can be a stripping column.

Alternatively, said distillation column can be a distillation and stripping column.

The distillation and/or stripping column is composed of a head condenser, a bottom reboiler, enrichment stages situated above the feeding and exhaustion stages situated below the feeding. Said enrichment and exhaustion stages can be obtained with plates for distillation and/or stripping columns, or with fillings of the structured or non-structured type.

For the purposes of the present invention, distillation and/or stripping columns having a configuration of the "asymmetric" type can be advantageously used, i.e. having a number of plates forming the theoretical enrichment stages equal to about half of the number of plates forming the theoretical exhaustion stages. Alternatively, distillation and/or stripping columns without plates forming the theoretical enrichment stages can be used.

For the purposes of the present invention and of the following claims, the term "aqueous stream" (i) leaving the head of the column" refers to the stream leaving the head condenser belonging to said column. Said condenser is preferably a total condenser.

For the purposes of the present invention and of the following claims, the term "aqueous stream" (ii) leaving the bottom of the column" refers to the stream leaving the bottom reboiler belonging to said column.

The distillation and/or stripping column preferably operates at atmospheric pressure even if said column is capable of functioning equally well at pressures higher or lower than atmospheric pressure such as, for example, at pressures ranging from 0.5 ata (atmosphere absolute) to 4 ata (atmosphere absolute).

The temperatures are generally determined by the pressure and composition of the aqueous stream coming from the Fischer-Tropsch reaction. In general, at operating pressures ranging from 0.5 ata (atmosphere absolute) to 4 ata (atmosphere absolute), the temperature at the head of the column is maintained within the range of 70° C. to 125° C., that at the bottom within the range of 90° C. to 160° C.

In said distillation and/or stripping column, in addition to the formation of the above aqueous streams (i) and (ii) indicated above, also occurs the elimination of the incondensable compounds present in the aqueous stream coming from the Fischer-Tropsch reaction.

For the purposes of the present description and of the following claims, the term "incondensable compounds" refer to traces of synthesis gas (e.g., hydrogen and/or carbon monoxide) possibly present in the aqueous stream coming from the Fischer-Tropsch reaction fed to the head of the column.

As specified above, the saturator generally has the function of providing the steam necessary for saturating the process gas, preferably natural gas, usually methane, before feeding this to the synthesis gas production plant. In the saturator, the water is generally put in contact with the above preheated process gas. For the purposes of the present invention, the saturator can operate either in countercurrent or in equicurrent, with or without external recirculation.

Any type of saturator known in the art can be advantageously used for the purposes of the present invention. Specific examples of saturators which can be advantageously used are: saturators of the vertical tube type, saturators of the spray tower type, saturators of the baffle tower type, saturators of the perforated plate tower type, saturators of the packed tower type, saturators of the wetted wall tower type, and the like.

Operating according to the process of the present invention, said gaseous stream (vi) leaves the head of the saturator, whereas a blowdown stream (vii) comprising salts of the acids present in said aqueous stream (i), leaves the bottom of the saturator, said salts deriving from the reaction of the organic acids present in said aqueous stream (i) with the organic base added thereto. Said blowdown stream (vii) can be discharged and fed to the distillation and/or stripping column, or it can be recycled to the saturator.

According to the process of the present invention, said blowdown stream (vii) is preferably fed to the distillation and/or stripping column, after being combined with the aqueous stream coming from the Fischer-Tropsch reaction.

The saturator preferably operates at a temperature ranging from 160° C. to 200° C. and at a pressure ranging from 30 barA (absolute bar) to 60 barA (bar absolute).

As already specified above, the separation of said vapour stream (iii) and of said aqueous stream (iv) takes place in the evaporator.

Any type of evaporator known in the art can be advantageously used for the purposes of the present invention. Specific examples of evaporators which can be advantageously used are: "natural circulation" evaporators in which the evaporation is caused by movements induced by boiling alone, evaporators in which the evaporation is caused by means of forced circulation in which the velocity and turbulence are increased with the use of a circulation pump (Forced-circulation Evaporators), evaporators of the ME-EV type (Multi Effect Evaporators), single stage or multi-stage evaporators, single effect evaporators, evaporators of the STV type (Short Tube Vertical Evaporators), evaporators of the LTV type (Long Tube Vertical Evaporators), basket type evaporators, horizontal tube evaporators, Falling Film Evaporators, Wiped Film Evaporators, and the like.

Alternatively, for the purposes of the present invention, the bottom reboiler belonging to the distillation column, can be advantageously used as evaporator.

More details relating to the types of evaporators used can be found, for example, in "Process Heat Transfer", Donald Q. Kern, McGraw-Hill (1950), Chapter 14, Evaporator, pg. 375-510; Perry's Chemical Engineers'Handbook, McGraw-Hill ($7^{th}$ Ed.—1997), Section 11, pgs. 108-118.

The evaporator preferably operates at a temperature ranging from 90° C. to 160° C. and at a pressure ranging from 0.5 ata (absolute atmospheres) to 4 ata (atmosphere absolute).

Before being fed to the distillation and/or stripping column, the aqueous stream coming from the Fischer-Tropsch reaction can be advantageously subjected to filtration, for example with the use of coalescence filters, or of separators capable of separating the hydrophilic compounds from the lipophilic compounds, in order to maximize the elimination of undesired organic compounds, in particular hydrocarbons, present in said aqueous phase, which could cause the formation of foams in the equipment downstream.

The formation of foams can also be avoided by the addition of a suitable antifoam agent selected, for example, from those commercially known (e.g. anionic surfactants, silicon surfactants, polyethylene glycols, or mixtures thereof).

According to a preferred embodiment of the present invention, said organic base has a boiling point ranging from 70° C. to 200° C., preferably from 90° C. to 150° C.

According to a preferred embodiment of the present invention, said organic base has a vapour pressure, at 20° C., ranging from 0.01 kPa to 10 KPa, preferably ranging from 0.02 kPa to 3 kPa.

According to a further preferred embodiment of the present invention, said organic base can be selected from: morpholine, piperazine, pyrrolidine, piperidine, pyrazolidine, 2,6- dimethylmorpholine, cyclohexylamine, diethylaminoethanol, 2-amino-2-methyl-1-propanol, or mixtures thereof. Morpholine is preferred.

According to a preferred embodiment of the present invention, said organic base can be added to the aqueous stream (i) in such an amount that the equivalent molar ratio of organic acid/organic base ranges from 0.50 to 1.60, preferably from 0.75 to 1.20.

According to a preferred embodiment of the present invention, said organic base can be added to the aqueous stream (i) in such an amount that the pH of said aqueous stream (v) is higher than or equal to 6, preferably ranging from 6.2 to 10.

It should be noted that for the purposes of the present invention, said organic base can be added in other points of the process. For example, said organic base can be added to the aqueous stream (iiia) leaving the head of the evaporator.

According to a preferred embodiment of the present invention, said organic base can be used in the form of an aqueous solution.

According to a preferred embodiment of the present invention, said inorganic base can be selected, for example, from hydroxides and/or oxides, of alkaline and/or alkaline earth metals belonging to groups 1 or 2 of the Periodic Table of Elements (in the IUPAC notation dated Jun. 22, 2007).

According to a further preferred embodiment of the present invention, said inorganic base can be selected from sodium hydroxide, potassium hydroxide, calcium hydroxide, magnesium hydroxide, lithium hydroxide, or mixtures thereof. Sodium hydroxide, potassium hydroxide, or mixtures thereof are preferred.

It should be noted that for the purposes of the present invention the $pK_a$ of said inorganic base is preferably higher than the $pK_a$ of the organic base.

According to a preferred embodiment of the present invention, said inorganic base can be added to the agueous stream (ii) in such an amount that the equivalent molar ratio of organic acid/inorganic base ranges from 0.50 to 1.50, preferably from 0.75 to 1.20.

According to a preferred embodiment of the present invention, said inorganic base can be added to the agueous stream (ii) in such an amount that the pH of the aqueous stream (iv) leaving the bottom of the evaporator is higher than or equal to 6.5, preferably ranging from 7 to 11.

It should be noted that for the purposes of the present invention, said inorganic base can be added in other points of the process. For example, said inorganic base can be added to the aqueous stream coming from the Fischer-Tropsch reaction before feeding said aqueous stream to the distillation and/or stripping column.

According to a preferred embodiment of the present invention, said inorganic base can be used in the form of an aqueous solution.

As already specified above, the process, object of the present invention allows at least part of the organic base to be recovered.

For the above purpose, said process comprises combining the blowdown stream (vii) leaving the bottom of the saturator with the aqueous stream coming from the Fischer-Tropsch reaction and feeding it to the distillation and/or stripping column. Said blowdown stream (vii) comprises salts deriving from the reaction of the organic acids present in the aqueous stream (i) with said organic base and possibly traces of non-reacted organic acids and base. In this case, an aqueous stream (viii) leaves the bottom of the distillation and/or stripping column, comprising, in addition to the organic acids as indicated above, salts deriving from the reaction of the organic acids present in the aqueous stream (i) with said organic base and possibly traces of non-reacted organic acids and/or organic base.

In the evaporator, the salts present in said aqueous stream (viii) can react with the strong inorganic base, releasing the organic base leaving the head of the evaporator with the vapour stream (iii). As mentioned above, said vapour stream (iii), after condensation, forms an aqueous stream (iiia) which is joined with the aqueous stream (i) obtaining an aqueous stream (v) which is fed to the saturator, in this way, allowing the organic base to be re-used.

According to a preferred embodiment of the present invention, said organic base is recovered with a yield higher than or equal to 500, preferably ranging from 600 to 99%, more preferably ranging from 85% to 950, said yield being calculated with respect to the total amount of organic base used at the beginning of the process.

The aqueous stream (iiia) has a concentration of water preferably higher than or equal to 95% by weight, more preferably higher than or equal to 98% by weight, with respect to the total weight of said aqueous stream (iiia). Said aqueous stream (iiia) can also comprise traces of non-reacted organic acids, and/or organic base, and/or inorganic base.

Said aqueous stream (iv) has a concentration of salts of organic acids preferably higher than or equal to 0.05% by weight, more preferably ranging from 0.1% by weight to 5% by weight, with respect to the total weight of said aqueous stream (iv).

Depending on the final use and consequently the degree of purity to be obtained, said aqueous stream (iv) can be subjected to further purification treatment such as, for example: ion exchange resins, reverse osmosis, crystallization, electrodialysis, biological.

In particular, said aqueous stream (iv), having a pH preferably higher than or equal to 6.5, preferably ranging from 7 to 11, and a C.O.D. preferably ranging from 500 mg/l to 12,000 mg/l, can be advantageously subjected to biological treatments of both the aerobic and anaerobic type.

When the C.O.D. is higher than 12,000 mg/l, said aqueous stream (iv) can be advantageously subjected to reverse osmosis treatment.

Figure 2:
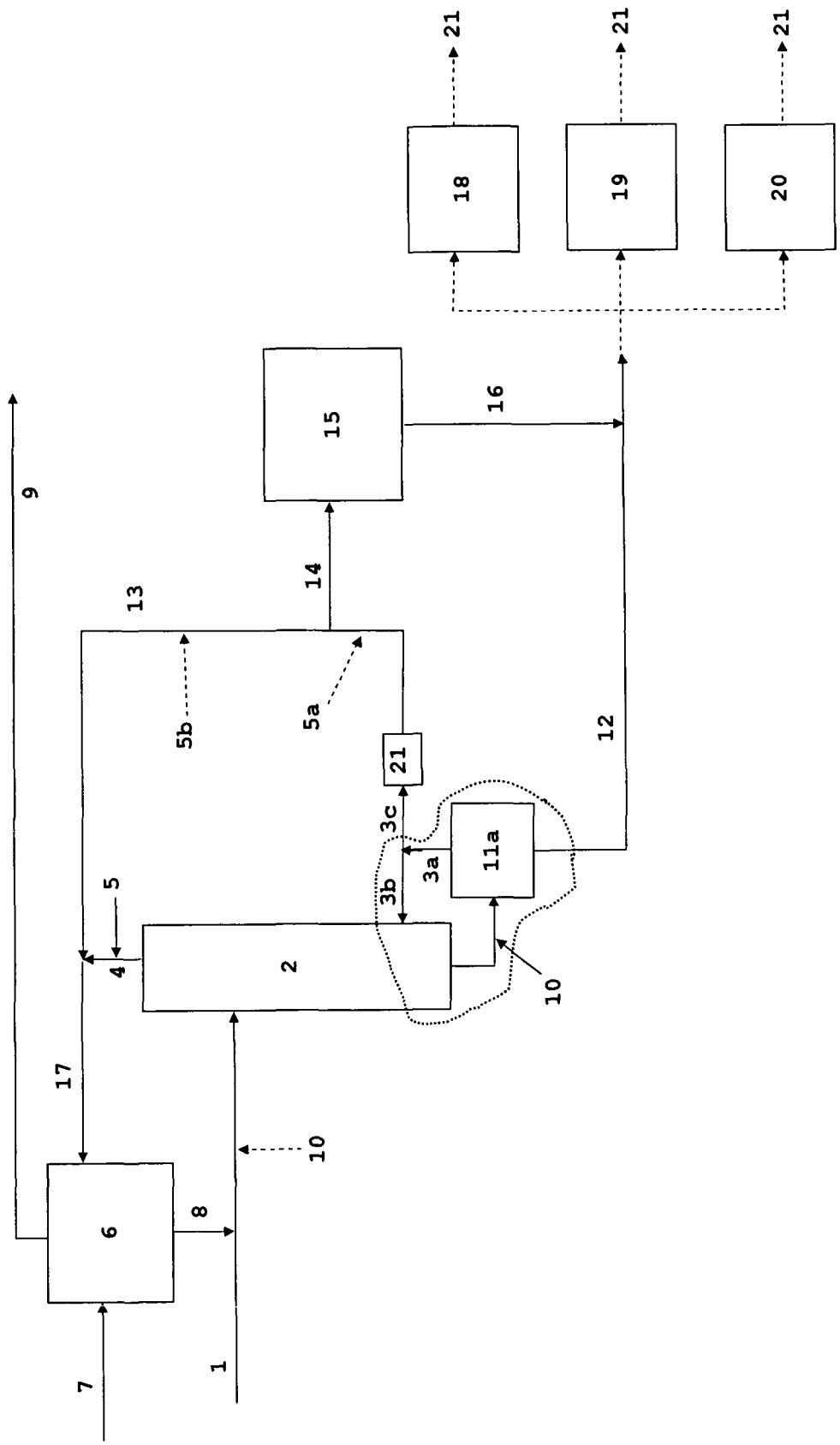
FIG. 2 represents a further embodiment of the process according to the present invention.
Figure 3:
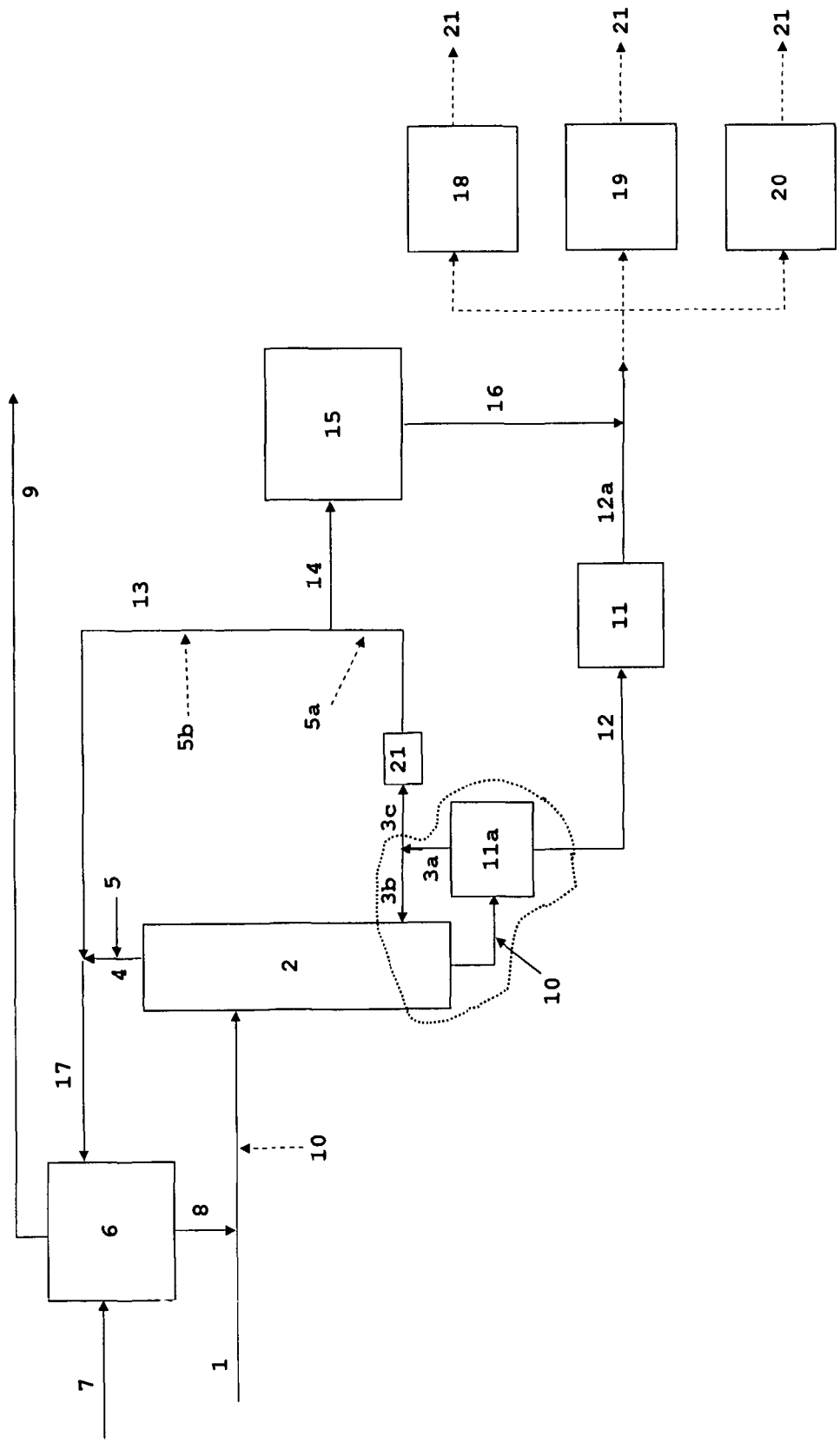
FIG. 3 represents a further embodiment of the process according to the present invention.

The present invention will now be illustrated in greater detail through different embodiments with reference to FIGS. 1-3 provided below.

The process of the present invention can be effected as represented, for example, in FIG. 1.

In this case, the aqueous stream (1) coming from the Fischer-Tropsch reaction, to which an antifoam agent has been added, is fed to a distillation column (2) consisting of a number of plates forming the enrichment stages situated above the feeding higher than 2, typically ranging from 3 to 15, and a number of plates forming the exhaustion stages situated below the feeding higher than 5, typically ranging from 6 to 30, more preferably ranging from 8 to 14. Said distillation column preferably consists of a number of plates forming the theoretical rectification (or enrichment) stages equal to 6 and of a number of plates forming the theoretical exhaustion stages equal to 12. The column (2) also comprises a head condenser (not represented in FIG. 1) and a bottom reboiler (not represented in FIG. 1).

As indicated above, the enrichment and exhaustion stages can be effected with plates for distillation columns or with filling of the structured or non-structured type.

An aqueous stream (4) enriched in alcohols comprising organic acids in an amount lower than or equal to 2% by weight, preferably ranging from 0.01% by weight to 1.2% by weight, with respect to the total weight of said aqueous stream (1), and possible other volatile compounds, leaves the head of the column.

An organic base (e.g., morpholine) (5) is added to said aqueous stream (4) in order to neutralize said aqueous stream (4) which generally has a pH lower than 5. The pH of the aqueous stream (4), as well as the pH of the various streams, is measured with pH meters known in the art, not represented in FIG. 1.

As specified above, the addition of said organic base (5) can be effected in other points of the process represented in FIG. 1 with the dashed arrow [(5a) and (5b)]. In particular, said organic base can be added to the aqueous stream (13) obtained after condensation in a suitable condenser (not represented in FIG. 1) of the vapour stream leaving the head of the evaporator (11) in the point (5a), before at least a part of said aqueous stream (13) is fed to the cooling tower (15); or, said organic base can be added in the point (5b), after at least a part of said aqueous stream (13) has been fed to the cooling tower (15).

After the addition of said organic base (5), the aqueous stream (4) is joined with said aqueous stream (13) forming the aqueous stream (17) which is fed to the saturator (6) to which the process gas (7) (e.g., natural gas) is also fed.

After reaction with the organic base (5), the organic acids present in the aqueous stream (4) are in the form of salts which are essentially recycled to the process object of the present invention by means of the blowdown stream (8) leaving the bottom of the saturator (6). The possible traces of non-reacted organic acids and/or organic base (5) are also essentially recycled to the process object of the present invention by means of the blowdown stream (8) leaving the bottom of the saturator (6).

A gaseous stream (9) then leaves the head of the saturator (6), which is fed to the production plant of synthesis gas, in particular to the steam reforming section (not represented in FIG. 1).

As represented in FIG. 1, said blowdown stream (8) is joined with said aqueous stream (1) coming from the Fischer-Tropsch reaction and sent to the distillation column (2).

The aqueous stream (3), also comprising salts of the organic acids obtained from the reaction with said organic base, is fed to the evaporator (11) which, in this specific case, also comprises a condenser (not represented in FIG. 1).

Said aqueous stream (3) also comprises the organic acids contained in the aqueous stream (1) and typically has a pH value lower than 4. In order to neutralize the pH of said aqueous stream (3), an inorganic base (10) (e.g., sodium hydroxide), is added to said aqueous stream (3). After reaction with the inorganic base (10), the acids present in the aqueous stream (3) are in the form of salts and are eliminated by means of the aqueous stream (12) leaving the bottom of the evaporator (11).

As specified above, the addition of said inorganic base to said aqueous stream (3) can be effected in other points of the process represented in FIG. 1 with the dashed arrow [(10a)]. In particular, said inorganic base can be added to the aqueous stream (1) before feeding it to the distillation column (2). In this case, the aqueous stream (3) typically has a pH value higher than 5, typically higher than 7.

Said inorganic base (10), in addition to reacting with the salts present in the aqueous stream (3), is also capable of reacting with the salts contained in the blowdown stream (8) releasing the organic base (5) and forming salts of the inorganic base (10). The organic base (5) released, passes into the aqueous stream (13) leaving the head of the evaporator (11). Possible traces of said organic base, and/or salts of said organic base can remain in the evaporator and can be eliminated by means of the aqueous stream (12) leaving the bottom of the evaporator (11).

Said aqueous stream (13) is joined with the aqueous stream (4) obtaining the aqueous stream (17), in this way allowing the organic base (5) to be re-used. Furthermore, the combining of said aqueous stream (13) and of said aqueous stream (4) allows the organic carbon deriving from the Fischer-Tropsch reaction to be recovered [in particular, the alcohols contained in the aqueous stream (4)] and to be used for the production of synthesis gas.

As represented in FIG. 1, a part of the aqueous stream (13), generally in an amount lower than or equal to 30% by weight with respect to the total weight of the aqueous stream (13), is fed (aqueous stream 14) to a cooling tower (15).

The cooled aqueous stream (16) leaving the cooling tower (15) can be used as cooling water in a heat exchanger (not represented in FIG. 1), or it can be joined with the aqueous stream (12) before feeding it to subsequent treatments.

Alternatively, the whole aqueous stream (13) can be fed to the saturator (6) (not represented in FIG. 1).

Depending on the required final use, the aqueous stream (12) can in fact be fed:
   to an anaerobic biological treatment (18);
   to an aerobic biological treatment (19);
   to a reverse osmosis treatment (20);
in order to obtain purified water (21).

As represented in FIG. 1, only one evaporator (11) is present. Before sending the aqueous stream (12) to one of the above indicated plants, i.e. (18), (19) o (20), however, further passages can be effected in one or more evaporators situated in series or in parallel.

FIG. 2 represents a further embodiment of the process according to the present invention.

In the description of FIG. 2, the reference numbers corresponding to those indicated in FIG. 1 have the same meaning and what is described in FIG. 1 is also valid for FIG. 2.

The embodiment illustrated in FIG. 2 differs from that of FIG. 1 in that the bottom reboiler (11a) belonging to the distillation column (2) (indicated in FIG. 2 with the dashed part), is used as evaporator. Furthermore, FIG. 2 indicates the stream (3a) leaving the reboiler (11a) which is partly, generally in an amount lower than or equal to 30% by weight with respect to the total weight of stream (3a), sent to the distillation column (2) [stream (3b)], and partly sent to a condenser (21) [stream (3c)] thus obtaining the aqueous stream (13).

FIG. 3 represents a further embodiment of the process according to the present invention.

In the description of FIG. 2, the reference numbers corresponding to those indicated in FIG. 1 and FIG. 2 have the same meaning and what is described in FIG. 1 and in FIG. 2 is also valid for FIG. 3.

The embodiment illustrated in FIG. 3 differs from that of FIG. 2 in that the aqueous stream (12) leaving the bottom of the reboiler (11a) is sent to the evaporator (11) before being sent (12a) to the subsequent treatment, i.e. (18), (19) or (20), indicated above.

Some illustrative and non-limiting examples are provided for a better understanding of the present invention and for its embodiment.

EXAMPLE 1

After having carried out the Fischer-Tropsch reaction as described in U.S. Pat. No. 6,348,510 (IFP-ENI) and with reference to FIG. 1, the water which is separated by decanting from the reaction effluent [aqueous stream (1)] was fed to a distillation column (2) having 6 enrichment stages and 12 exhaustion stages, a total head condenser and a bottom reboiler, at a nominal flow-rate of 350 t/h.

2 ppm of antifoam agent polypropylene glycol having an average molecular weight of 2,000 were added to the feeding.

The distillation column, operating at atmospheric pressure and at a temperature ranging from 90° C. (head temperature) to 105° C. (tail temperature), was managed so as to have an aqueous stream leaving the head of the distillation column [aqueous stream (4)] equal to 6.4 t/h which, after suitable pumping, was sent to the saturator (6).

The aqueous stream (4) rich in alcohols proved to have the following composition, obtained by means of gas chromatography:
alcohols: 59% by weight with respect to the total weight of said aqueous stream (4);
acids: 0.9% by weight with respect to the total weight of said aqueous stream (4).

The aqueous stream (3) leaving the bottom reboiler of the distillation column (2) comprising acids proved to have the following composition, obtained by means of gas chromatography:
acids: 95% by weight with respect to the total weight of the acids present in the feeding.

Different amounts of morpholine were added to the aqueous stream (4): the amount of morpholine added, the pH of the aqueous stream (17), as well as the recovery of said morpholine are reported in Table 1 (Test A-E).

TABLE 1

| Test | Amount of morpholine [kmol/h] | Amount of morpholine with respect to stoichiometric value | pH(*) | Morpholine recovery (yield - wt %) |
|---|---|---|---|---|
| A | 0.512 | 1.00 | 6.5 | 90.3 |
| B | 0.553 | 1.08 | 7.5 | 90.2 |
| C | 0.635 | 1.24 | 7.8 | 90.0 |
| D | 0.717 | 1.40 | 8.1 | 89.5 |
| E | 0.819 | 1.60 | 8.3 | 88.0 |

(*)pH of the aqueous stream (17)

The recovery yield of the morpholine was measured by subjecting the aqueous stream (13) leaving the head of the evaporator (11) to analysis of the total nitrogen content by means of chromatography with a TOC-TN analyzer.

The aqueous stream (3), to which an amount of an aqueous solution at 500 of sodium hydroxide equal to 980 kg/h was added, was sent to the evaporator (11) [of the type ME-EV (Multi-Effect Evaporator)] at an overall nominal flow-rate equal to 344.6 t/h. The amount of sodium hydroxide added is such so as to bring the pH at the inlet of the evaporator to a value of about 9.

An aqueous stream (12) enriched in salts of the organic acids present in the aqueous stream (3), was obtained at the outlet of the evaporator (11). Said aqueous stream (12), leaving at a nominal flow-rate equal to 224.6 t/h, after suitable cooling, can be sent to subsequent purification treatments.

A vapour stream equal to 120 t/h was obtained from the head of the evaporator (11), which was sent, at a nominal flow-rate equal to 120 t/h to a condenser. The stream (13) leaving the condenser is partly sent to the cooling tower (15) at a nominal flow-rate equal to 6.8 t/h and partly to the saturator (6) at a nominal flow-rate equal to 113.2 t/h. Said stream (13), before being sent to the saturator is joined with the aqueous stream (4) having a nominal flow-rate equal to 6.4 t/h. An aqueous stream (16) was obtained from the cooling tower (15), which was used as cooling water (stream 16) of the aqueous stream (12).

After being joined to form the aqueous stream (17), the aqueous stream (4) and the aqueous stream (13), were sent to the saturator (6) at a nominal flow-rate equal to 119.6 t/h, the pH of the aqueous stream (17) proved to be equal to 9.

The saturator (6) is a vertical tube saturator equipped with a vapour heating system and an external recirculation circuit equipped with a gas/liquid separator, operating at a pressure of 40 bar and 180° C., in equicurrent with the flow of natural gas to be saturated. Natural gas was then sent to the saturator (6), in countercurrent, at a nominal flow-rate equal to 450,000 Nm³/h.

A blowdown stream (8) was obtained at the outlet of the saturator (6) at a nominal flow-rate equal to 10 t/h.

Said blowdown stream (8), comprising salts deriving from the reaction of the organic acids present in the aqueous stream (1) with morpholine, was joined with the aqueous stream (1) and sent to the distillation column (2).

A saturated gaseous stream (9) having a nominal flow-rate equal to 600,000 Nm³/h, was obtained at the outlet of the head of the saturator (6), which was sent to the production plant of synthesis gas.

The invention claimed is:

1. A process for purifying an aqueous stream coming from a Fischer-Tropsch reaction, the process comprising:
   (A) feeding a raw aqueous stream comprising at least one organic by-product of the Fischer-Tropsch reaction into a distillation column, thereby obtaining a first aqueous stream and a second aqueous stream:
   the first aqueous aqueous stream (i), leaving a head of the column, enriched in at least one alcohol having from 1 to 20 carbon atoms, comprising at least one organic acid having from 1 to 8 carbon atoms, in an amount lower than or equal to 2% by weight with respect to a total weight of the first aqueous stream (i);
   the second aqueous stream (ii) leaving a bottom of the column comprising at least one organic acid having from 1 to 10 carbon atoms;
   (B) adding at least one organic base having a pK$_a$, measured at 25° C. in water, higher than or equal to 6 to the first aqueous stream (i);
   (C1) adding at least one inorganic base having a pK$_a$, measured at 25° C. in water, higher than or equal to 7 to the second aqueous stream (ii), to obtain a treated second aqueous stream, and feeding the treated second aqueous stream to an evaporator, thereby obtaining two outgoing streams, a fourth aqueous stream and a vapor stream:
   (C2) condensing the vapor stream (iii) leaving a head of the evaporator, comprising at least a part of the organic base which to generate a third aqueous stream (iiia); and
   the fourth aqueous stream (iv) leaving a bottom of the evaporator comprising at least one salt of the at least one organic acid present in the second aqueous stream (ii);
   (D) combining the third aqueous stream (iiia) with the first aqueous stream (i), obtaining a fifth aqueous stream (v) and feeding the fifth aqueous stream (v) to a saturator;
   (E) feeding a process gas to the saturator, thereby obtaining a gaseous stream (vi) leaving a head of the saturator;
   (F) feeding the gaseous stream (vi) to a synthesis gas production plant.

2. The process of claim 1, wherein the first aqueous stream (i) comprises organic acid in an amount ranging from 0.01% by weight to 1.2% by weight with respect to the total weight of the first aqueous stream (i).

3. The process of claim 1, wherein the organic base has a pKa, measured at 25° C. in water, ranging from 7 to 12.

4. The process of claim 1, wherein the inorganic base has a pK$_a$, measured at 25° C. in water, higher than or equal to 8.

5. The process of claim 1, wherein the gaseous stream (vi) is fed to a catalytic steam reformer in the synthesis gas production plant.

6. The process of claim 1, wherein the first aqueous stream (i) has a concentration of alcohols higher than or equal to 20% by weight with respect to the total weight of the first aqueous stream (i).

7. The process of claim 1, wherein the second aqueous stream (ii) has a concentration of organic acid higher than or equal to 0.05% by weight with respect to a total weight of the second aqueous stream (ii).

8. The process of claim 1, wherein the second aqueous stream (ii) comprises an amount of organic acid higher than or equal to 40% by weight with respect to a total weight of acid present in the raw aqueous stream fed to the distillation column.

9. The process of claim 1, wherein, from a bottom of the saturator, exits a blowdown stream (vii) comprising at least one salt of the at least one acid present in the first aqueous stream (i),
wherein the at least one salt deriving from a reaction of organic acid present in the first aqueous stream (i) with the organic base added thereto.

10. The process of claim 1, wherein the saturator operates at a temperature ranging from 160° C. to 200° C. and at a pressure ranging from 30 barA (bar absolute) to 60 barA (bar absolute).

11. The process of claim 1, wherein the evaporator operates at a temperature ranging from 90° C. to 160° C. and at a pressure ranging from 0.5 ata (atmospheres absolute) to 4 ata (atmospheres absolute).

12. The process of claim 1, wherein the organic base has a boiling point ranging from 70° C. to 200° C.

13. The process of claim 1, wherein the organic base has a vapor pressure, at 20° C., ranging from 0.01 kPa to 10 kPa.

14. The process of claim 1, wherein the organic base is selected from the group consisting of morpholine, piperazine, pyrrolidine, pyperidine, pyrazolidine, 2,6-dymethylmorpholine, cyclohexylamine, diethylaminoethanol, 2-amino-2-methyl-1-propanol, and a combination thereof.

15. The process of claim 1, wherein the organic base is added to the first aqueous stream (i) in an amount such that an equivalent molar ratio of organic acid/organic base ranges from 0.50 to 1.60.

16. The process of claim 1, wherein the organic base is added to the first aqueous stream (i) in such an amount that the pH of the fifth aqueous stream (v) is higher than or equal to 6.

17. The process of claim 1, wherein the inorganic base is at 1 st one selected from the group consisting of a hydroxide of an alkaline metal, a hydroxide of an alkaline earth metal, an oxide of an alkaline metal, an oxide of an alkaline earth metal, and a combination thereof.

18. The process of claim 17, wherein the inorganic base is selected from the group consisting of sodium hydroxide, potassium hydroxide, calcium hydroxide, magnesium hydroxide, lithium hydroxide, and a combination thereof.

19. The process of claim 1, wherein the inorganic base is added to the second aqueous stream (ii) in such an amount that an equivalent molar ratio of organic acid/inorganic base ranges from 0.50 to 1.50.

20. The process of claim 1, wherein the inorganic base is added to the second aqueous stream (ii) in such an amount that the pH of the fourth aqueous stream (iv) leaving the bottom of the evaporator is higher than or equal to 6.5.

21. The process of claim 1, wherein the organic base is recovered with a yield higher than or equal to 50%,
wherein the yield is calculated with respect to a total amount of organic base added at a beginning of the process.

22. The process of claim 1, wherein the third aqueous stream (iiia) has a water concentration higher than or equal to 95% by weight with respect to a total weight of the third aqueous stream (iiia).

23. The process of claim 1, wherein the fourth aqueous stream (iv) has a concentration of organic acid salt higher than or equal to 0.05% by weight with respect to a total weight of the fourth aqueous stream (iv).

* * * * *